US010805272B2

(12) United States Patent
Mayya et al.

(10) Patent No.: US 10,805,272 B2
(45) Date of Patent: Oct. 13, 2020

(54) METHOD AND SYSTEM OF ESTABLISHING A VIRTUAL PRIVATE NETWORK IN A CLOUD SERVICE FOR BRANCH NETWORKING

(71) Applicant: Nicira, Inc., Palo Alto, CA (US)

(72) Inventors: Ajit Ramachandra Mayya, Saratoga, CA (US); Parag Pritam Thakore, Los Gatos, CA (US); Stephen Craig Connors, San Jose, CA (US); Steven Michael Woo, Los Altos, CA (US); Sunil Mukundan, Chennai (IN); Thomas Harold Speeter, San Martin, CA (US)

(73) Assignee: NICIRA, INC., Palo Alto, CA (US)

( * ) Notice: Subject to any disclaimer, the term of this patent is extended or adjusted under 35 U.S.C. 154(b) by 136 days.

(21) Appl. No.: 16/179,675

(22) Filed: Nov. 2, 2018

(65) Prior Publication Data

US 2019/0075083 A1 Mar. 7, 2019

Related U.S. Application Data

(63) Continuation of application No. 15/097,282, filed on Apr. 12, 2016, now Pat. No. 10,135,789.
(Continued)

(51) Int. Cl.
*H04L 29/06* (2006.01)
*H04L 12/66* (2006.01)
(Continued)

(52) U.S. Cl.
CPC ...... *H04L 63/0272* (2013.01); *H04L 12/4633* (2013.01); *H04L 12/4641* (2013.01);
(Continued)

(58) Field of Classification Search
CPC . H04L 63/0272; H04L 63/0281; H04L 45/42; H04L 49/35; H04L 12/66;
(Continued)

(56) References Cited

U.S. PATENT DOCUMENTS 5,652,751 A * 7/1997 Sharony .................. H04L 45/02
370/227
6,154,465 A 11/2000 Pickett
(Continued)

FOREIGN PATENT DOCUMENTS

EP 1912381 A1 4/2008
EP 3041178 A1 7/2016
(Continued)

OTHER PUBLICATIONS

Non-Published commonly Owned U.S. Appl. No. 15/701,115, filed Sep. 11, 2017, 21 pages, Nicira, Inc.
(Continued)

*Primary Examiner* — J. Brant Murphy
(74) *Attorney, Agent, or Firm* — Adeli LLP

(57) ABSTRACT

In one aspect, a computerized system useful for implementing a virtual private network (VPN) including an edge device that automatically establishes an Internet Protocol Security (IPsec) tunnel alongside an unsecure Multipath Protocol (MP) tunnel with a gateway device in preparation for a transmission of a secure traffic communication. The edge device has a list of local subnets. The edge device sends the list of local subnets to the gateway during an initial MP tunnel establishment handshake message exchange between the edge device and the gateway device. Each subnet includes an indication of whether the subnet is reachable over the VPN. A gateway device that automatically establishes the IPsec tunnel alongside the unsecure MP tunnel with the edge device. An enterprise datacenter server that
(Continued)

comprises an orchestrator module that receives a toggle the VPN command and enables the VPN on the orchestrator. The orchestrator informs the edge device the list of subnets is accessible over the VPN causing the edge device to update the gateway device with a new list of subnets of the edge device that accessible over the VPN.

20 Claims, 9 Drawing Sheets

Related U.S. Application Data

(60) Provisional application No. 62/146,786, filed on Apr. 13, 2015.

(51) Int. Cl.
*H04L 12/46* (2006.01)
*H04L 12/717* (2013.01)
*H04L 12/931* (2013.01)
*H04L 29/08* (2006.01)
*G06N 20/00* (2019.01)

(52) U.S. Cl.
CPC .............. *H04L 12/66* (2013.01); *H04L 45/42* (2013.01); *H04L 49/35* (2013.01); *H04L 63/029* (2013.01); *H04L 63/0281* (2013.01); *G06N 20/00* (2019.01); *H04L 67/10* (2013.01)

(58) Field of Classification Search
CPC .............. H04L 12/4633; H04L 12/4641; H04L 63/029; H04L 67/10; G06N 20/00
See application file for complete search history.

(56) References Cited

U.S. PATENT DOCUMENTS

| | | | |
|---|---|---|---|
| 6,445,682 B1 | 9/2002 | Weitz | |
| 7,003,481 B2* | 2/2006 | Banka | G06Q 30/0601 705/26.1 |
| 7,320,017 B1 | 1/2008 | Kurapati et al. | |
| 7,680,925 B2 | 3/2010 | Sathyanarayana et al. | |
| 7,962,458 B2 | 6/2011 | Holenstein et al. | |
| 8,111,692 B2 | 2/2012 | Ray | |
| 8,224,971 B1 | 7/2012 | Miller et al. | |
| 8,228,928 B2 | 7/2012 | Parandekar et al. | |
| 8,243,589 B1 | 8/2012 | Trost et al. | |
| 8,259,566 B2 | 9/2012 | Chen et al. | |
| 8,566,452 B1* | 10/2013 | Goodwin, III | H04L 63/0281 709/227 |
| 8,724,456 B1 | 5/2014 | Hong et al. | |
| 8,804,745 B1 | 8/2014 | Sinn | |
| 8,806,482 B1 | 8/2014 | Nagargadde et al. | |
| 8,856,339 B2 | 10/2014 | Mestery et al. | |
| 8,964,548 B1 | 2/2015 | Keralapura et al. | |
| 9,009,217 B1 | 4/2015 | Nagargadde et al. | |
| 9,055,000 B1 | 6/2015 | Ghosh et al. | |
| 9,060,025 B2* | 6/2015 | Xu | H04L 63/0272 |
| 9,071,607 B2* | 6/2015 | Twitchell, Jr. | H04L 45/586 |
| 9,075,771 B1 | 7/2015 | Gawali et al. | |
| 9,154,327 B1 | 10/2015 | Marino et al. | |
| 9,306,949 B1 | 4/2016 | Richard et al. | |
| 9,336,040 B2 | 5/2016 | Dong et al. | |
| 9,354,983 B1 | 5/2016 | Yenamandra et al. | |
| 9,413,724 B2* | 8/2016 | Xu | H04L 63/0272 |
| 9,432,245 B1 | 8/2016 | Sorenson et al. | |
| 9,450,817 B1 | 9/2016 | Bahadur et al. | |
| 9,450,852 B1 | 9/2016 | Chen et al. | |
| 9,462,010 B1 | 10/2016 | Stevenson | |
| 9,525,564 B2 | 12/2016 | Lee | |
| 9,608,962 B1 | 3/2017 | Chang | |
| 9,665,432 B2 | 5/2017 | Kruse et al. | |
| 9,686,127 B2 | 6/2017 | Ramachandran et al. | |
| 9,715,401 B2 | 7/2017 | Devine et al. | |
| 9,722,815 B2 | 8/2017 | Mukundan et al. | |
| 9,787,559 B1 | 10/2017 | Schroeder | |
| 9,825,822 B1 | 11/2017 | Holland | |
| 9,825,992 B2* | 11/2017 | Xu | H04L 63/0272 |
| 9,906,401 B1 | 2/2018 | Rao | |
| 10,057,183 B2 | 8/2018 | Salle et al. | |
| 10,057,294 B2* | 8/2018 | Xu | H04L 67/10 |
| 10,135,789 B2 | 11/2018 | Mayya et al. | |
| 10,178,032 B1 | 1/2019 | Freitas | |
| 10,187,289 B1 | 1/2019 | Chen et al. | |
| 10,229,017 B1 | 3/2019 | Zou et al. | |
| 10,237,123 B2 | 3/2019 | Dubey et al. | |
| 10,320,664 B2 | 6/2019 | Nainar et al. | |
| 10,326,830 B1 | 6/2019 | Singh | |
| 10,348,767 B1 | 7/2019 | Lee et al. | |
| 10,425,382 B2 | 9/2019 | Mayya et al. | |
| 10,454,714 B2 | 10/2019 | Mayya et al. | |
| 10,498,652 B2 | 12/2019 | Mayya et al. | |
| 10,523,539 B2 | 12/2019 | Mayya et al. | |
| 10,574,528 B2 | 2/2020 | Mayya et al. | |
| 10,594,516 B2 | 3/2020 | Cidon et al. | |
| 10,608,844 B2 | 3/2020 | Cidon et al. | |
| 2002/0198840 A1* | 12/2002 | Banka | H04L 67/16 705/50 |
| 2003/0088697 A1 | 5/2003 | Matsuhira | |
| 2003/0112808 A1* | 6/2003 | Solomon | H04L 12/4633 370/400 |
| 2003/0126468 A1 | 7/2003 | Markham | |
| 2003/0161313 A1 | 8/2003 | Jinmei et al. | |
| 2003/0202506 A1 | 10/2003 | Perkins et al. | |
| 2003/0219030 A1 | 11/2003 | Gubbi | |
| 2004/0059831 A1* | 3/2004 | Chu | H04L 41/0893 709/242 |
| 2004/0068668 A1* | 4/2004 | Lor | H04W 12/1202 726/15 |
| 2004/0224771 A1 | 11/2004 | Chen et al. | |
| 2005/0078690 A1 | 4/2005 | DeLangis | |
| 2006/0002291 A1 | 1/2006 | Alicherry et al. | |
| 2006/0114838 A1* | 6/2006 | Mandavilli | H04L 45/00 370/254 |
| 2006/0171365 A1* | 8/2006 | Borella | H04W 8/02 370/338 |
| 2006/0182034 A1 | 8/2006 | Klinker et al. | |
| 2006/0193247 A1 | 8/2006 | Naseh et al. | |
| 2007/0064604 A1 | 3/2007 | Chen et al. | |
| 2007/0091794 A1 | 4/2007 | Filsfils et al. | |
| 2007/0121486 A1* | 5/2007 | Guichard | H04L 45/22 370/216 |
| 2007/0177511 A1 | 8/2007 | Das et al. | |
| 2007/0260746 A1* | 11/2007 | Mirtorabi | H04L 45/02 709/238 |
| 2008/0049621 A1* | 2/2008 | McGuire | H04L 12/4645 370/236.2 |
| 2008/0080509 A1* | 4/2008 | Khanna | H04L 12/4641 370/392 |
| 2008/0095187 A1 | 4/2008 | Jung et al. | |
| 2008/0219276 A1* | 9/2008 | Shah | H04L 61/10 370/401 |
| 2008/0240121 A1* | 10/2008 | Xiong | H04L 45/24 370/401 |
| 2009/0013210 A1 | 1/2009 | McIntosh et al. | |
| 2009/0125617 A1* | 5/2009 | Klessig | H04L 45/00 709/223 |
| 2009/0154463 A1* | 6/2009 | Hines | H04L 67/1053 370/392 |
| 2009/0247204 A1 | 10/2009 | Sennett et al. | |
| 2010/0008361 A1* | 1/2010 | Guichard | H04L 45/50 370/392 |
| 2010/0088440 A1 | 4/2010 | Banks et al. | |
| 2010/0118727 A1 | 5/2010 | Draves et al. | |
| 2010/0191884 A1 | 7/2010 | Holenstein et al. | |
| 2010/0223621 A1 | 9/2010 | Joshi et al. | |
| 2010/0332657 A1 | 12/2010 | Elyashev et al. | |
| 2011/0032939 A1 | 2/2011 | Nozaki et al. | |
| 2011/0040814 A1 | 2/2011 | Higgins | |
| 2011/0075674 A1 | 3/2011 | Li et al. | |
| 2011/0110370 A1 | 5/2011 | Moreno et al. | |
| 2011/0153909 A1 | 6/2011 | Dong | |

(56) References Cited

U.S. PATENT DOCUMENTS

| | | | |
|---|---|---|---|
| 2012/0008630 A1* | 1/2012 | Ould-Brahim | H04L 45/66 370/392 |
| 2012/0027013 A1 | 2/2012 | Napierala | |
| 2012/0157068 A1 | 6/2012 | Eichen et al. | |
| 2012/0173919 A1 | 7/2012 | Patel et al. | |
| 2012/0221955 A1 | 8/2012 | Raleigh et al. | |
| 2012/0250682 A1 | 10/2012 | Vincent et al. | |
| 2012/0250686 A1 | 10/2012 | Vincent et al. | |
| 2012/0300615 A1 | 11/2012 | Kempf et al. | |
| 2012/0317291 A1 | 12/2012 | Wolfe | |
| 2013/0019005 A1 | 1/2013 | Hui et al. | |
| 2013/0021968 A1 | 1/2013 | Reznik et al. | |
| 2013/0044764 A1 | 2/2013 | Casado et al. | |
| 2013/0051399 A1 | 2/2013 | Zhang et al. | |
| 2013/0054763 A1 | 2/2013 | Merwe et al. | |
| 2013/0103834 A1 | 4/2013 | Dzerve et al. | |
| 2013/0124718 A1 | 5/2013 | Griffith et al. | |
| 2013/0124911 A1 | 5/2013 | Griffith et al. | |
| 2013/0124912 A1 | 5/2013 | Griffith et al. | |
| 2013/0128889 A1 | 5/2013 | Mathur et al. | |
| 2013/0142201 A1 | 6/2013 | Kim et al. | |
| 2013/0173788 A1* | 7/2013 | Song | H04L 45/02 709/224 |
| 2013/0182712 A1* | 7/2013 | Aguayo | H04L 41/12 370/395.53 |
| 2013/0238782 A1 | 9/2013 | Zhao et al. | |
| 2013/0242718 A1 | 9/2013 | Zhang | |
| 2013/0254599 A1 | 9/2013 | Katkar et al. | |
| 2013/0258839 A1 | 10/2013 | Wang et al. | |
| 2013/0283364 A1 | 10/2013 | Chang et al. | |
| 2013/0301642 A1 | 11/2013 | Radhakrishnan et al. | |
| 2013/0315243 A1* | 11/2013 | Huang | H04L 61/256 370/392 |
| 2013/0329548 A1 | 12/2013 | Nakil et al. | |
| 2014/0019604 A1* | 1/2014 | Twitchell, Jr. | H04L 67/141 709/223 |
| 2014/0092907 A1 | 4/2014 | Sridhar et al. | |
| 2014/0108665 A1 | 4/2014 | Arora et al. | |
| 2014/0156818 A1 | 6/2014 | Hunt | |
| 2014/0156823 A1 | 6/2014 | Liu et al. | |
| 2014/0164560 A1 | 6/2014 | Ko et al. | |
| 2014/0173113 A1 | 6/2014 | Vemuri et al. | |
| 2014/0173331 A1 | 6/2014 | Martin et al. | |
| 2014/0219135 A1* | 8/2014 | Li | H04L 12/4641 370/254 |
| 2014/0223507 A1* | 8/2014 | Xu | H04L 67/10 726/1 |
| 2014/0244851 A1 | 8/2014 | Lee | |
| 2014/0279862 A1* | 9/2014 | Dietz | H04L 41/0806 707/609 |
| 2014/0317440 A1 | 10/2014 | Biermayr et al. | |
| 2014/0337500 A1 | 11/2014 | Lee | |
| 2014/0341109 A1* | 11/2014 | Cartmell | H04L 43/50 370/328 |
| 2015/0016249 A1 | 1/2015 | Mukundan et al. | |
| 2015/0029864 A1 | 1/2015 | Raileanu et al. | |
| 2015/0046572 A1 | 2/2015 | Cheng et al. | |
| 2015/0052247 A1 | 2/2015 | Threefoot et al. | |
| 2015/0058917 A1* | 2/2015 | Xu | H04L 63/10 726/1 |
| 2015/0088942 A1 | 3/2015 | Shah | |
| 2015/0089628 A1 | 3/2015 | Lang | |
| 2015/0092603 A1* | 4/2015 | Aguayo | H04L 12/4675 370/254 |
| 2015/0096011 A1 | 4/2015 | Watt | |
| 2015/0146539 A1 | 5/2015 | Mehta et al. | |
| 2015/0172121 A1 | 6/2015 | Farkas et al. | |
| 2015/0188823 A1 | 7/2015 | Williams et al. | |
| 2015/0201036 A1 | 7/2015 | Nishiki et al. | |
| 2015/0222543 A1 | 8/2015 | Song | |
| 2015/0236962 A1 | 8/2015 | Veres et al. | |
| 2015/0249644 A1* | 9/2015 | Xu | H04L 63/0272 726/1 |
| 2015/0334696 A1* | 11/2015 | Gu | H04L 61/2015 718/1 |
| 2015/0350907 A1 | 12/2015 | Timariu et al. | |
| 2015/0363733 A1* | 12/2015 | Brown | G06Q 10/10 705/7.26 |
| 2015/0372943 A1 | 12/2015 | Hasan et al. | |
| 2015/0381493 A1 | 12/2015 | Bansal et al. | |
| 2016/0035183 A1 | 2/2016 | Buchholz et al. | |
| 2016/0036924 A1 | 2/2016 | Koppolu et al. | |
| 2016/0072669 A1 | 3/2016 | Saavedra | |
| 2016/0105471 A1 | 4/2016 | Nunes et al. | |
| 2016/0134528 A1 | 5/2016 | Lin et al. | |
| 2016/0142373 A1* | 5/2016 | Ossipov | H04L 63/061 713/171 |
| 2016/0164832 A1 | 6/2016 | Bellagamba et al. | |
| 2016/0164914 A1 | 6/2016 | Madhav et al. | |
| 2016/0173338 A1 | 6/2016 | Wolting | |
| 2016/0191363 A1 | 6/2016 | Haraszti et al. | |
| 2016/0191374 A1* | 6/2016 | Singh | H04L 45/22 370/228 |
| 2016/0197834 A1 | 7/2016 | Luft | |
| 2016/0197835 A1 | 7/2016 | Luft | |
| 2016/0198003 A1 | 7/2016 | Luft | |
| 2016/0210209 A1 | 7/2016 | Verkaik et al. | |
| 2016/0218947 A1 | 7/2016 | Hughes et al. | |
| 2016/0255169 A1 | 9/2016 | Kovvuri et al. | |
| 2016/0261639 A1* | 9/2016 | Xu | H04L 63/0823 |
| 2016/0269926 A1 | 9/2016 | Sundaram | |
| 2016/0315912 A1 | 10/2016 | Mayya et al. | |
| 2016/0352588 A1 | 12/2016 | Subbarayan et al. | |
| 2016/0359738 A1 | 12/2016 | Sullenberger et al. | |
| 2016/0380886 A1 | 12/2016 | Blair et al. | |
| 2017/0012870 A1 | 1/2017 | Blair et al. | |
| 2017/0026283 A1 | 1/2017 | Williams et al. | |
| 2017/0034129 A1 | 2/2017 | Sawant et al. | |
| 2017/0053258 A1 | 2/2017 | Carney et al. | |
| 2017/0055131 A1 | 2/2017 | Kong et al. | |
| 2017/0063782 A1 | 3/2017 | Jain et al. | |
| 2017/0064005 A1 | 3/2017 | Lee | |
| 2017/0093625 A1 | 3/2017 | Pera et al. | |
| 2017/0097841 A1 | 4/2017 | Chang et al. | |
| 2017/0104755 A1 | 4/2017 | Arregoces et al. | |
| 2017/0118173 A1 | 4/2017 | Arramreddy et al. | |
| 2017/0123939 A1 | 5/2017 | Maheshwari et al. | |
| 2017/0126564 A1 | 5/2017 | Mayya | |
| 2017/0134186 A1 | 5/2017 | Mukundan et al. | |
| 2017/0163473 A1 | 6/2017 | Sadana et al. | |
| 2017/0181210 A1 | 6/2017 | Nadella et al. | |
| 2017/0195169 A1 | 7/2017 | Mills et al. | |
| 2017/0201585 A1 | 7/2017 | Doraiswamy et al. | |
| 2017/0207976 A1 | 7/2017 | Rovner et al. | |
| 2017/0214545 A1 | 7/2017 | Cheng et al. | |
| 2017/0214701 A1 | 7/2017 | Hasan | |
| 2017/0223117 A1 | 8/2017 | Messerli et al. | |
| 2017/0237710 A1 | 8/2017 | Mayya et al. | |
| 2017/0257260 A1 | 9/2017 | Govindan et al. | |
| 2017/0257309 A1 | 9/2017 | Appanna | |
| 2017/0264496 A1 | 9/2017 | Ao et al. | |
| 2017/0279717 A1 | 9/2017 | Bethers et al. | |
| 2017/0310691 A1 | 10/2017 | Vasseur et al. | |
| 2017/0317974 A1 | 11/2017 | Masurekar et al. | |
| 2017/0337086 A1 | 11/2017 | Zhu et al. | |
| 2017/0339070 A1 | 11/2017 | Chang et al. | |
| 2017/0364419 A1 | 12/2017 | Lo | |
| 2018/0014051 A1 | 1/2018 | Phillips et al. | |
| 2018/0034668 A1 | 2/2018 | Mayya et al. | |
| 2018/0041425 A1 | 2/2018 | Zhang | |
| 2018/0069924 A1 | 3/2018 | Tumuluru et al. | |
| 2018/0074909 A1 | 3/2018 | Bishop et al. | |
| 2018/0077081 A1 | 3/2018 | Lauer et al. | |
| 2018/0077202 A1* | 3/2018 | Xu | H04L 63/0272 |
| 2018/0084081 A1 | 3/2018 | Kuchibhotla et al. | |
| 2018/0131720 A1 | 5/2018 | Hobson et al. | |
| 2018/0145899 A1 | 5/2018 | Rao | |
| 2018/0167378 A1 | 6/2018 | Kostyukov et al. | |
| 2018/0176082 A1 | 6/2018 | Katz et al. | |
| 2018/0176130 A1 | 6/2018 | Banerjee et al. | |
| 2018/0213472 A1 | 7/2018 | Ishii et al. | |
| 2018/0234300 A1 | 8/2018 | Mayya et al. | |

(56) References Cited

U.S. PATENT DOCUMENTS

| | | |
|---|---|---|
| 2018/0260125 A1 | 9/2018 | Botes et al. |
| 2018/0270104 A1 | 9/2018 | Zheng |
| 2018/0278541 A1 | 9/2018 | Wu et al. |
| 2018/0295529 A1 | 10/2018 | Jen et al. |
| 2018/0302286 A1 | 10/2018 | Mayya et al. |
| 2018/0351855 A1 | 12/2018 | Sood et al. |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2019/0020588 A1 | 1/2019 | Twitchell, Jr. |
| 2019/0028552 A1 | 1/2019 | Johnson et al. |
| 2019/0046056 A1 | 2/2019 | Khachaturian et al. |
| 2019/0058709 A1 | 2/2019 | Kempf et al. |
| 2019/0068470 A1 | 2/2019 | Mirsky |
| 2019/0068500 A1 | 2/2019 | Hira |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0140889 A1 | 5/2019 | Mayya et al. |
| 2019/0140890 A1 | 5/2019 | Mayya et al. |
| 2019/0158605 A1 | 5/2019 | Markuze et al. |
| 2019/0268421 A1 | 8/2019 | Markuze et al. |
| 2019/0313907 A1 | 10/2019 | Khachaturian et al. |
| 2020/0014661 A1 | 1/2020 | Mayya et al. |
| 2020/0106706 A1 | 4/2020 | Mayya et al. |

FOREIGN PATENT DOCUMENTS

| | | |
|---|---|---|
| WO | 2012167184 A2 | 12/2012 |
| WO | 2017083975 A1 | 5/2017 |
| WO | 2019070611 A1 | 4/2019 |
| WO | 2019094522 A1 | 5/2019 |

OTHER PUBLICATIONS

Non-Published commonly Owned U.S. Appl. No. 15/784,404, filed Oct. 16, 2017, 21 pages, Nicira, Inc.

Non-Published commonly Owned U.S. Appl. No. 15/838,052, filed Dec. 11, 2017, 28 pages, Nicira, Inc.

Non-Published commonly Owned U.S. Appl. No. 15/838,355, filed Dec. 12, 2017, 30 pages, Nicira, Inc.

Non-Published commonly Owned U.S. Appl. No. 15/972,083, filed May 4, 2018, 93 pages, Nicira, Inc.

Non-Published commonly Owned U.S. Appl. No. 15/972,086, filed May 4, 2018, 93 pages, Nicira, Inc.

Non-Published commonly Owned U.S. Appl. No. 15/972,088, filed May 4, 2018, 94 pages, Nicira, Inc.

Non-Published commonly Owned U.S. Appl. No. 15/972,090, filed May 4, 2018, 93 pages, Nicira, Inc.

Non-Published commonly Owned U.S. Appl. No. 15/972,091, filed May 4, 2018, 94 pages, Nicira, Inc.

Non-Published commonly Owned U.S. Appl. No. 15/972,093, filed May 4, 2018, 93 pages, Nicira, Inc.

Non-Published commonly Owned U.S. Appl. No. 15/972,095, filed May 4, 2018, 93 pages, Nicira, Inc.

Non-Published commonly Owned U.S. Appl. No. 15/972,098, filed May 4, 2018, 94 pages, Nicira, Inc.

Non-Published commonly Owned U.S. Appl. No. 15/972,100, filed May 4, 2018, 93 pages, Nicira, Inc.

Non-Published commonly Owned U.S. Appl. No. 15/972,102, filed May 4, 2018, 93 pages, Nicira, Inc.

Non-Published commonly Owned U.S. Appl. No. 15/972,103, filed May 4, 2018, 93 pages, Nicira, Inc.

Non-Published commonly Owned U.S. Appl. No. 15/972,104, filed May 4, 2018, 93 pages, Nicira, Inc.

Petition for Post-Grant Review of U.S. Pat. No. 9,722,815, filed May 1, 2018, 106 pages.

Non-published Commonly Owned U.S. Appl. No. 16/576,751, filed Sep. 19, 2019, 42 pages, Nicira, Inc.

Non-published Commonly Owned U.S. Appl. No. 16/656,555, filed Oct. 17, 2019, 40 pages, Nicira, Inc.

Non-published Commonly Owned U.S. Appl. No. 16/699,719, filed Dec. 1, 2019, 42 pages, Nicira, Inc.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

* cited by examiner

METHOD AND SYSTEM OF ESTABLISHING A VIRTUAL PRIVATE NETWORK IN A CLOUD SERVICE FOR BRANCH NETWORKING

CROSS-REFERENCE TO RELATED APPLICATIONS

The present application is a continuation of U.S. patent application Ser. No. 15/097,282, filed Apr. 12, 2016, now issued as U.S. Pat. No. 10,135,789. U.S. patent application Ser. No. 15/097,282 claims priority from U.S. Provisional Patent Application 62/146,786, filed 13 Apr. 2015. U.S. patent application Ser. No. 15/097,282, now issued as U.S. Pat. No. 10,135,789, and U.S. Provisional Patent Application 62/146,786 are hereby incorporated by reference in their entirety.

FIELD OF THE INVENTION

This application relates generally to computer networking, and more specifically to a system, article of manufacture and method of establishing a virtual private network in a cloud service for branch networking.

DESCRIPTION OF THE RELATED ART

Employees working in branch offices of an Enterprises typically need to access resources that are located in another branch office. In some cases, these are located in the Enterprise Data Center, which is a central location for resources. Access to these resources is typically obtained by using a site-to-site VPN, which establishes a secure connection over a public network (e.g. the Internet, etc.). There may be dedicated computer equipment in the branch office, the other branch office and/or Data Center which establishes and maintains the secure connection. These types of site-to-site VPNs need to be setup one at a time and can be resource intensive to set up and maintain.

BRIEF SUMMARY OF THE INVENTION

In one aspect, a computerized system useful for implementing a virtual private network (VPN) including an edge device that automatically establishes an Internet Protocol Security (IPsec) tunnel alongside an unsecure Multipath Protocol (MP) tunnel with a gateway device in preparation for a transmission of a secure traffic communication. The edge device has a list of local subnets. The edge device sends the list of local subnets to the gateway during an initial MP tunnel establishment handshake message exchange between the edge device and the gateway device. Each subnet includes an indication of whether the subnet is reachable over the VPN. A gateway device that automatically establishes the IPsec tunnel alongside the unsecure MP tunnel with the edge device. An enterprise datacenter server that comprises an orchestrator module that receives a toggle the VPN command and enables the VPN on the orchestrator. The orchestrator informs the edge device the list of subnets is accessible over the VPN causing the edge device to update the gateway device with a new list of subnets of the edge device that accessible over the VPN.

Figure 1:
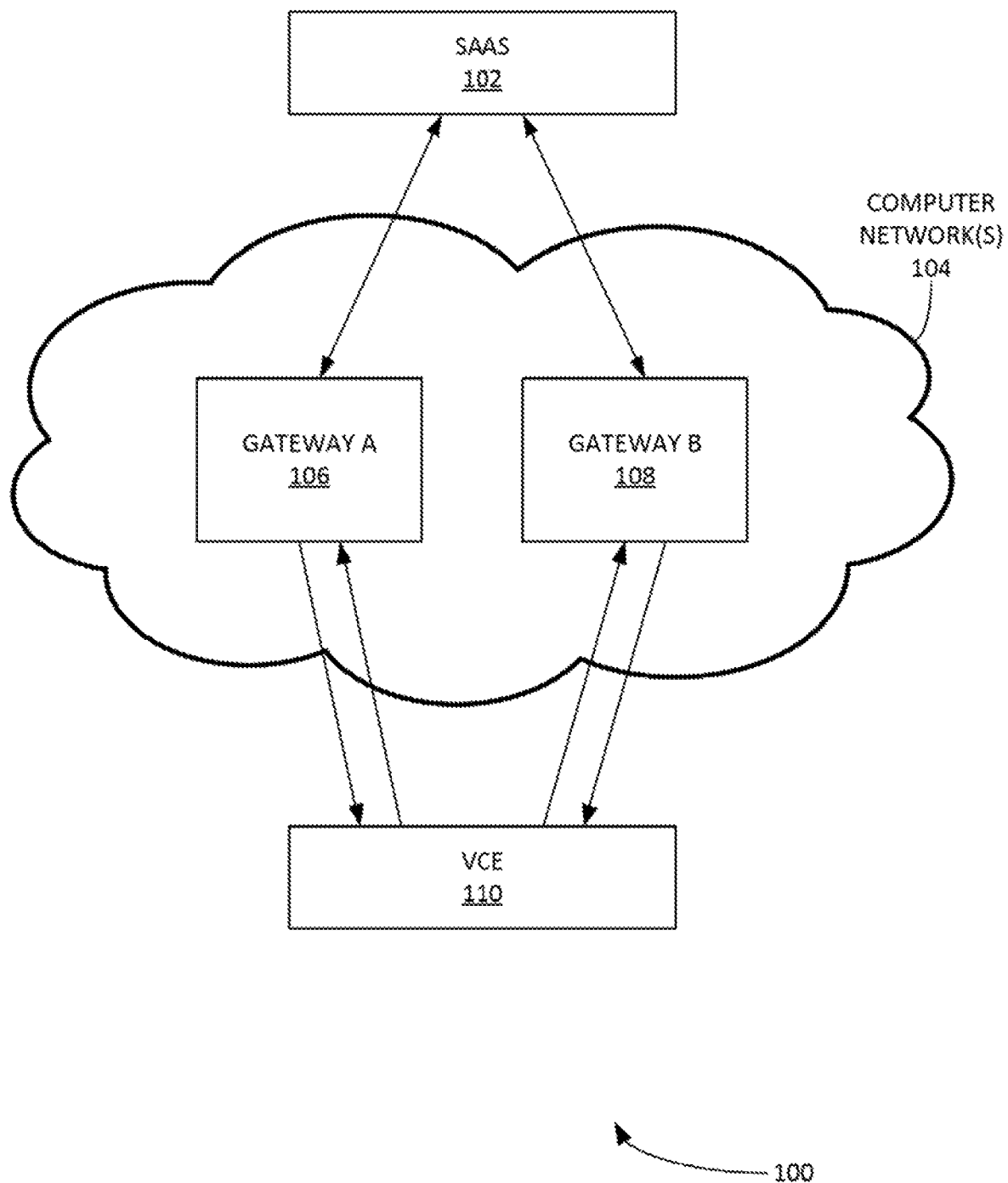
FIG. 1 illustrates an example self-healing network with redundant gateways, according to some embodiments.

The Figures described above are a representative set, and are not exhaustive with respect to embodying the invention.

DESCRIPTION

Disclosed are a system, method, and article of manufacture for establishing a virtual private network in a cloud service for branch networking. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

Example definitions for some embodiments are now provided.

Cloud computing can involve deploying groups of remote servers and/or software networks that allow centralized data storage and online access to computer services or resources. These groups of remote serves and/or software networks can be a collection of remote computing services.

Cloud Edge (CE) can include a cloud multipath to an Internet endpoint.

Customer-premises equipment (CPE) can be any terminal and associated equipment located at a subscriber's premises and connected with a carrier's telecommunication channel at the demarcation point.

Edge device can be a device that provides an entry point into enterprise or service provider core networks. An edge device can be software running in a virtual machine (VM) located in a branch office and/or customer premises.

Flow can be a grouping of packets that match a five (5) tuple which is a combination of Source IP Address (SIP), Destination IP Address (DIP), L4 Source Port (SPORT) and L4 Destination Port (DPORT) and the L4 protocol (PROTO).

Forward error correction (FEC) (e.g. channel coding) can be a technique used for controlling errors in data transmission over unreliable or noisy communication channels.

Deep learning can be a type of machine learning based on a set of algorithms that attempt to model high-level abstractions in data by using model architectures, with complex structures or otherwise, composed of multiple non-linear transformations Deep Packet Inspection (DPI) can be the ability to analyze the different layers of a packet on the network.

Gateway can be a node (e.g. a router) on a computer network that serves as an access point to another network.

Internet Protocol Security (IPsec) can be a protocol suite for securing Internet Protocol (IP) communications by authenticating and encrypting each IP packet of a communication session.

Multiprotocol Label Switching (MPLS) can be a mechanism in telecommunications networks that directs data from one network node to the next based on short path labels rather than long network addresses, thus avoiding complex lookups in a routing table.

Orchestrator can include a software component that provides multi-tenant and role based centralized configuration management and visibility.

Quality of Service (QoS) can include the ability to define a guaranteed set of actions such as routing, resource constraints (e.g. bandwidth, latency etc.).

Software as a service (SaaS) can be a software licensing and delivery model in which software is licensed on a subscription basis and is centrally hosted.

Tunneling protocol can allow a network user to access or provide a network service that the underlying network does not support or provide directly.

Virtual Desktop Infrastructure (VDI) is a desktop-oriented service that hosts user desktop environments on remote servers and/or blade PCs. Users access the desktops over a network using a remote display protocol.

Virtual private network (VPN) can extend a private network across a public network, such as the Internet. It can enable users to send and receive data across shared or public networks as if their computing devices were directly connected to the private network, and thus benefit from the functionality, security and management policies of the private network.

Voice over IP (VoIP) can a methodology and group of technologies for the delivery of voice communications and multimedia sessions over Internet Protocol (IP) networks, such as the Internet.

Additional example definitions are provided herein.

Scalable, Self-Healing Network Cloud Service for Branch Networking

FIG. 1 illustrates an example self-healing network 100 with redundant gateways, according to some embodiments. In network 100, data traffic can be routed to different gateways for different purposes. Multiple gateways can serve the same destination utilizing dynamic routing protocol. As services (e.g. SaaS 102) in the Internet (e.g. computer networks 104) may not centrally located. The combination of the Internet's wide distribution of services and/or changes in the transport quality across can lead to the use of different egress points to access different destinations. This is accomplished by deploying multiple gateways (e.g. gateways A-B 106-108) in stand-alone or redundant configurations.

An orchestrator can inform each edge device (e.g. VCE 110) of a list of gateways it has been assigned. Additionally, routes and/or services can be assigned a subset of the gateway list that can be used for communication with a specific destination. The edge device can then perform a static determination by metrics assigned to each gateway. For example, each gateway can be assigned a metric based on geographic distance from the edge and/or a dynamic determination based on empirically measured loss, latency and/or jitter to the gateway across the Internet.

In the redundant configuration of FIG. 1, gateways A-B 106-108 can support dynamic routing protocols on the non-edge device side. This can ensure that the gateway chosen for traffic destined from the edge to the gateway is also advertised from the gateway upstream as the route with the lowest cost for return traffic. Various attributes of gateways are now discussed.

Figure 2:
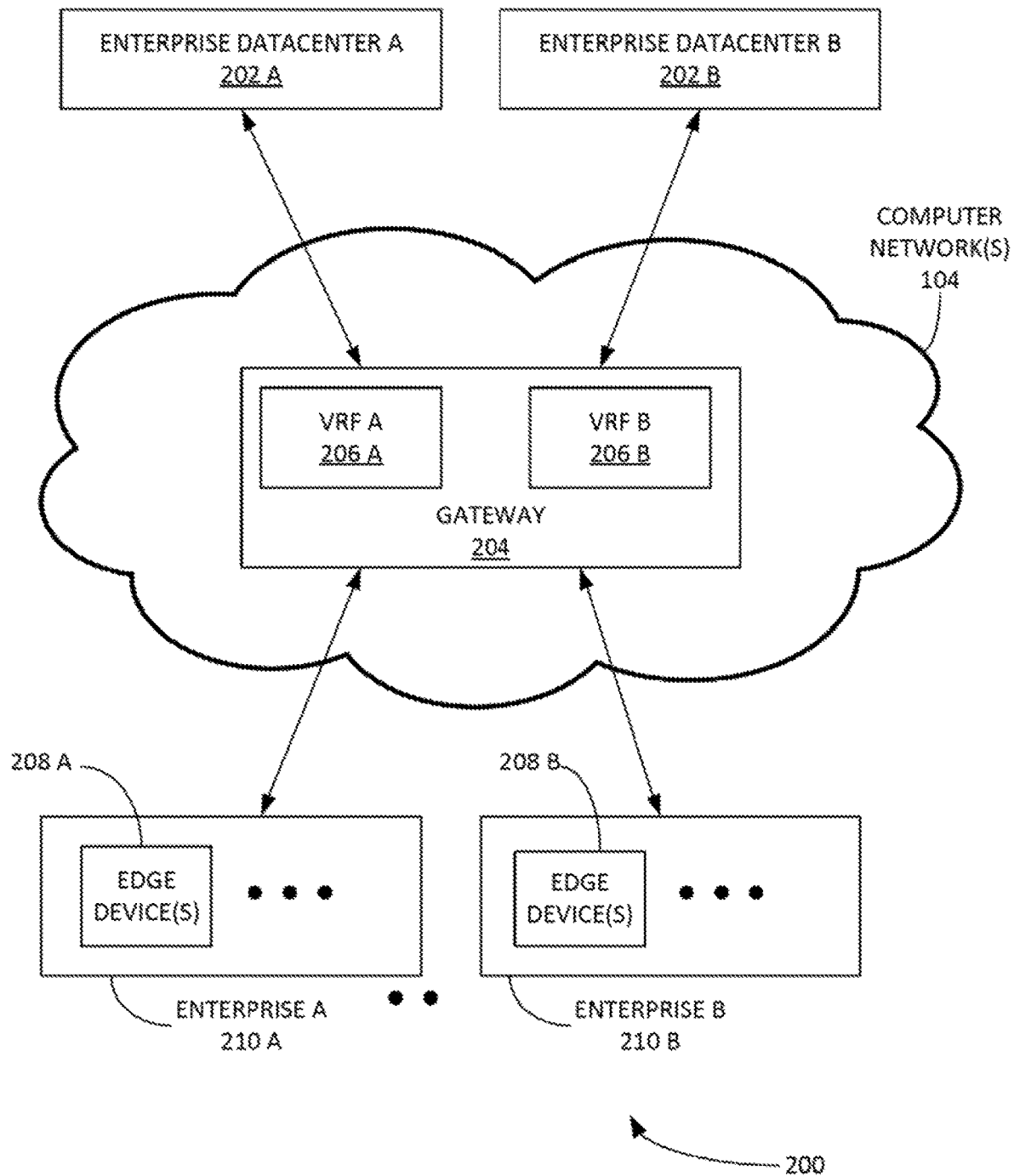
FIG. 2 illustrates an example system that includes autonomous gateways, according to some embodiments

FIG. 2 illustrates an example system 200 that includes autonomous gateways, according to some embodiments. Gateway High Availability (HA) and horizontal scalability can be inherent as configuration is edge-driven and not configured on gateway 204. Edge tunnel initialization can configure, gateway 204. Edge devices 208 A-B can communicate QoS information to gateway 204 so they have information on how to treat network traffic. Implementing versioning in the flow header can ensures that gateway 204 have the correct QoS information. This is accomplished by creating flows with a version number of 1 on the edge and incrementing this version every time a policy change is enacted on the edge. If the gateway receives a message with a higher than expected version number in the header, it will request the edge to send the updated policy information.

It is noted that each individual gateway is a self-contained autonomous entity. This is accomplished by driving configuration of gateway 204 through the edge devices 208 A-B rather than gateway 204 being directly configured by the Orchestrator. In the initial negotiation, edge devices 208 A-B can send an MP_INIT message (e.g. an initial MP tunnel establishment handshake message exchange between the edge device and the gateway device) which contains all the information needed to identify the edge device and serve as a secure and unsecure gateway for edge device traffic. This can include a logical identifier for the enterprise which is used for virtual routing and/or forwarding. The logical identifier can also be used for subnets that are routable behind edge devices 208 A-B.

If edge devices 208 A-B is the first edge device belonging to the enterprise to connect to gateway 204, a new virtual routing and forwarding (VRF) table can be created for the enterprise. Edge devices 208 A-B's subnets can be inserted into the enterprise VRF. If edge devices 208 A-B are not the first from an enterprise to connect, the enterprise logical identifier can be used to index into the existing VRF and edge devices 208 A-B's subnets can be added to the existing table.

In another example, when a new flow is created on an edge device, the parameters used to perform QoS and/or routing on the flow can be transmitted along with the first packet to any of the gateway 204 that are handling the flow. In this manner gateway 204 can be inherently highly available. If the gateway service is removed and replaced with a new gateway service instance, edge devices 208 A-B can send a new MP_INIT which can recreate the VRF and then continue sending data traffic uninterrupted through the gateway.

By this same token, gateway 204 can be highly available because the edge can switch between gateways without interrupting customer traffic. For example, when an orchestrator inserts an additional gateway in a gateway list that can be assigned an edge device. The edge device can then connect and begin using the gateway seamlessly without any requirement for orchestrator to gateway communication. This removes the need for the orchestrator to synchronize configuration changes on the edge device and the gateway as the edge device is used as the intermediary.

In another example, a gateway need not be a single gateway instance but the Internet Protocol (IP) address may be the external facing IP address of a gateway load balancer. The gateway load balancer can start and stop individual gateway instances. If the gateway load balancers detects that an instance is near its CPU and/or throughput capacity, it can shift traffic to an alternate gateway transparently and/or create a new gateway and begin steering connections to it. When gateway reboots, upgrades or maintenance are required, the gateway load balancer can steer traffic away from those instances that require maintenance to make these operations transparent to the end user.

Figure 3:
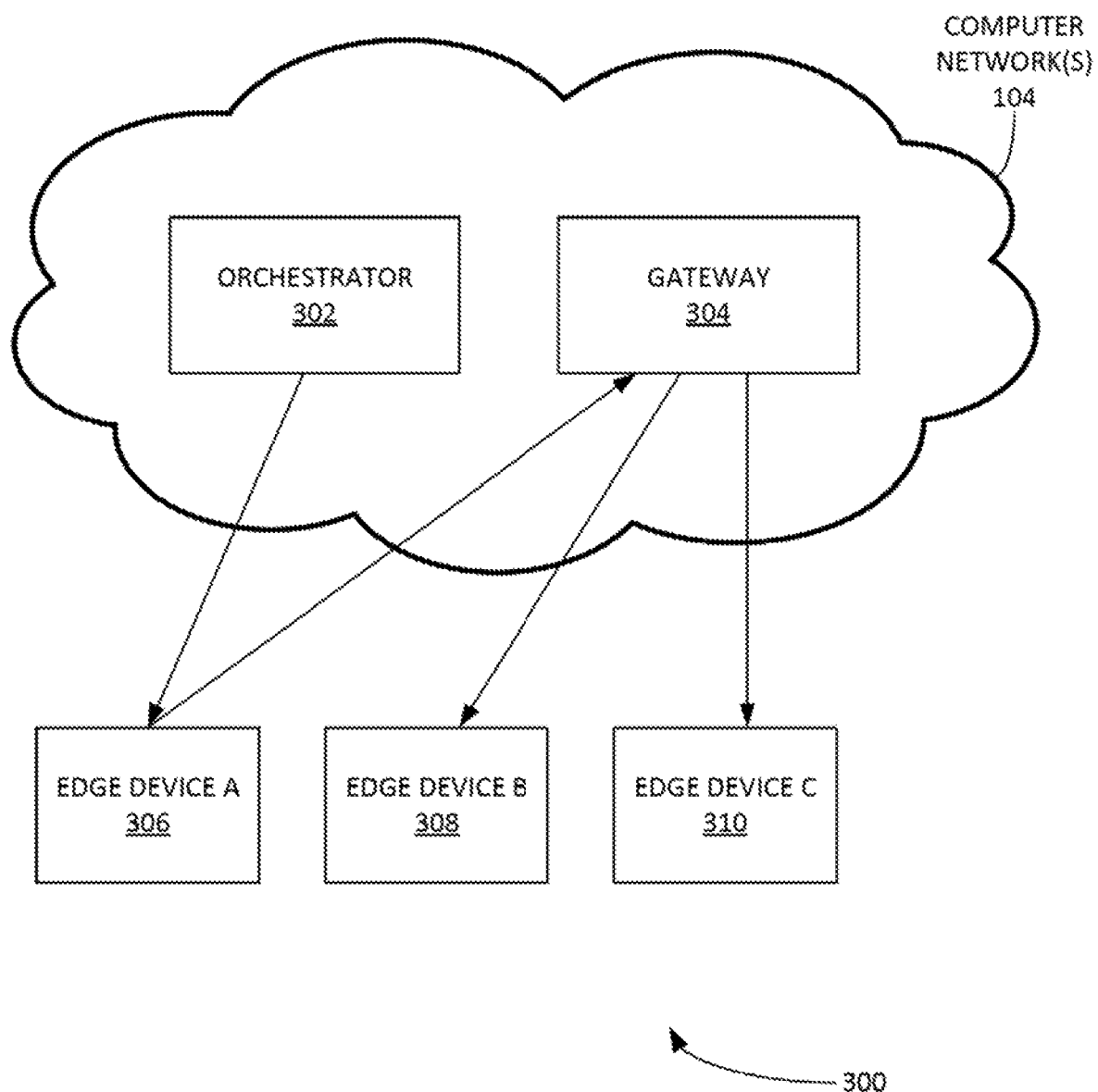
FIG. 3 illustrates an example of a system of an instant VPN, according to some embodiments.

FIG. 3 illustrates an example of a system 300 of an instant VPN, according to some embodiments. The edge device and gateway can automatically negotiate IPsec tunnels alongside their unsecure Velocloud Multipath Protocol (VCMP) tunnels in preparation for the transmission of secure traffic. This can be performed irrespective of whether or not a VPN has been enabled on the device. In this manner, the network can be prepared to transmit secure traffic at any time. Leveraging this, an "Instant VPN" can be delivered by toggling VPN on or off on the orchestrator. Each edge device has a list of local subnets that are sent to the gateway during MP_INIT. Each subnet is can include an indication of whether or not it is reachable over VPN. When VPN is enabled on the orchestrator, each edge device can be informed that its subnets are reachable over VPN and each edge device can update its gateways with this information. When VPN is disabled on the orchestrator, each edge device can be informed that its subnets are not reachable over VPN. The edge device can update the gateway accordingly.

Between each edge device and its associated gateways can be a routing protocol. The routing protocol can relay state information to peers that are one hop away. For example, edge device A can have a subnet A. Edge device B can have subnet B. When the user enables VPN on the orchestrator, edge device A and edge device B can inform the gateways that their local subnets A and B are reachable over VPN. The gateway(s) can then inform peers in the enterprise VRF. In this way, a message can be sent to edge device B instructing it that subnet A is now reachable through it. A message can also be sent to edge device A instructing it that subnet B is now reachable through it. When an edge device loses connectivity to a gateway, the gateway can relay to peers in the VRF that the subnet is no longer reachable and the edge device updates it route table to mark all routes via that unreachable gateway. In this way, gateways can be added or removed, and/or routes added and removed, without restarts and/or loss of connectivity assuming at least one gateway is connected at all times.

In some examples, "Always on" IPsec tunnels can be provided. Enable/disable VPN operations can include the insertion and/or removal of routes for the appropriate VPN zone. VRF can include enterprise logical identifier on gateway ensuring multi-tenancy.

Figure 4:
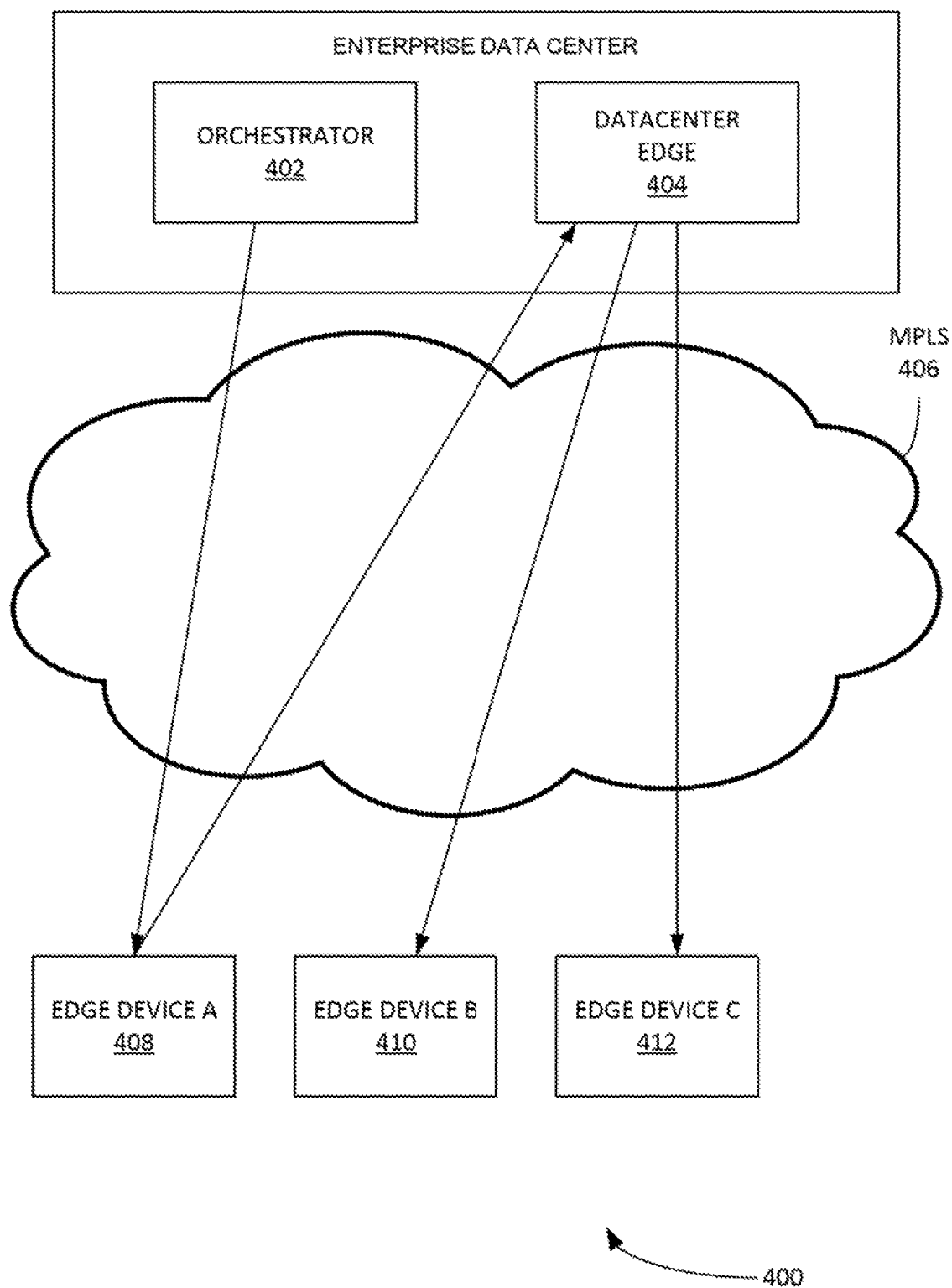
FIG. 4 illustrates another example of a system of an instant VPN, according to some embodiments.

FIG. 4 illustrates another example of a system 400 of an instant VPN, according to some embodiments. A special edge device called a Datacenter Edge (DCE) can be deployed as customer premise equipment. The DCE can subsume some of the functionality of the gateway, including this route protocol management. A typical use case for this deployment can be in a pure MPLS network in which there are no public internet links and thus no public internet gateways. In one example, route propagation can occur the same as described supra except that the VRF and routing protocol messages are managed by the DCE.

Figure 5A:
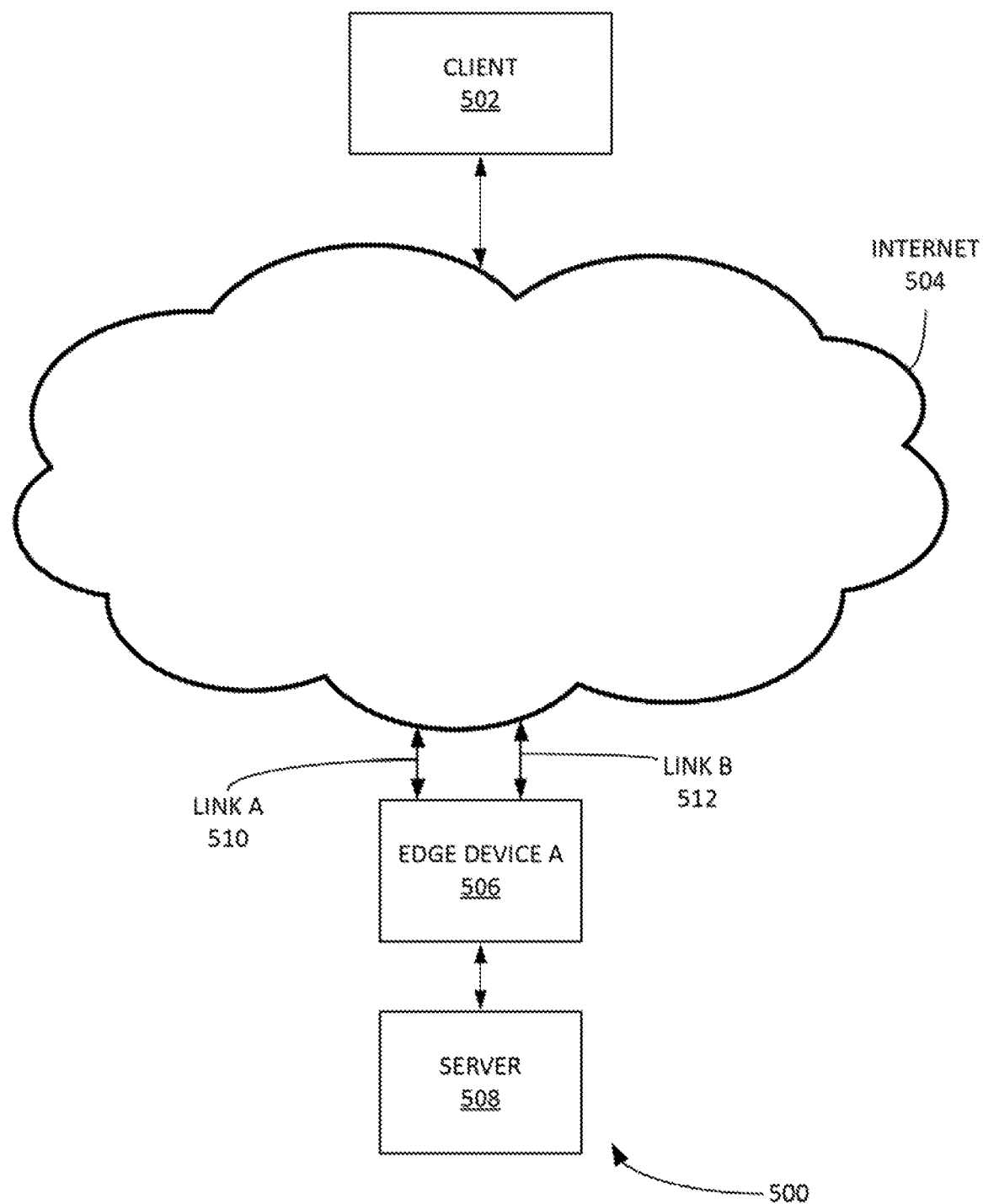
FIGS. 5 A-B illustrates an example of a system of a cloud multipath to an Internet endpoint, according to some embodiments.
Figure 5B:
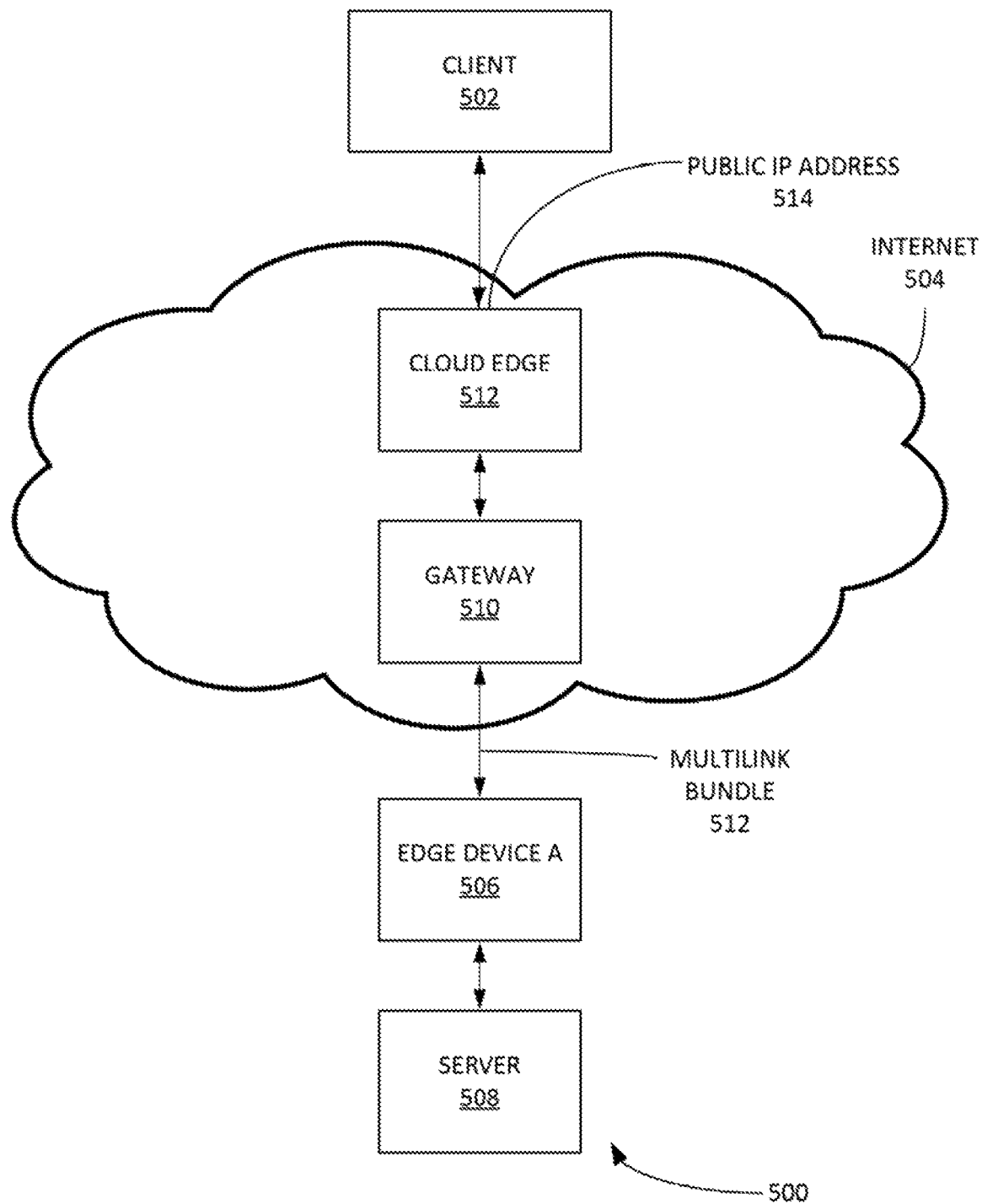

FIGS. 5 A-B illustrate an example of a system 500 of a cloud multipath to an Internet endpoint (branch) (e.g. a cloud edge 512), according to some embodiments. An edge and gateway multipath solution can deliver a reliable connection across the public internet for outbound connections initiated from the edge (e.g. edge devices 506) through the gateway 510, as well as for their return traffic. An alternate use case can include when the network traffic needs to be initiated from outside. For example, the network traffic can be initiated from the Internet to a server in the branch office behind the edge device. In an example deployment, this can be implemented by enabling inbound firewall rules to allow the traffic in one or more of the wide area network (WAN) links attached to the edge device. Such an inbound connection will be able to use only a single link. This may not provide the same reliability that is afforded to outbound connections. For instance, a session established on link A may fail if link A fails, and similarly for link B. Therefore there is a desire to be able to support inbound connections reliably without compromising the security of the deployment.

This can be achieved by a Cloud Edge (CE). The CE can sit in the cloud and joins the same VRF as that of the edge(s) with resources (e.g. a server) that are to be reliably accessed. This can be set to deny inbound traffic by default. However, it can allow the user to specify sources and destinations of traffic that are permitted. For example, a rule could be created that allows the public IP address of the client to reach the server via a public IP address that is assigned to the "LAN" side of the CE. The user can then connect to this public IP address in the cloud rather than the IP address of one of the links at the site directly, and securely connect over VPN to the server inside the network. The CE can be located anywhere in the Public Internet. In one example, the CE can be located in any of the public Cloud Service Providers (CSPs) like Amazon EC2®.

Intelligent Edge Device

An intelligent edge device can provide intelligent QoS. For example, applications may respond differently to key network parameters like latency, jitter, bandwidth, packet loss and processing capabilities such as available CPU cycles. For example, a VoIP application may use low bandwidth and may be sensitive to jitter, packet loss. The VoIP application may also consume a large number of CPU cycles despite the low throughput (e.g. because of smaller packet sizes). In contrast, VDI may use high bandwidth and low latency but may not very sensitive to jitter. Accordingly, a network stack can implement a suite of link optimization and remediation technologies to achieve the dual goal of optimal network resource utilization and remediating adverse network events, such as, inter alia: FEC to compensate for packet loss; jitter buffering to counter jitter; and per-packet load balancing to aggregate bandwidth usage and ensure the lowest latency path.

Smart QoS can map application flow into a traffic class and priority queue. A combination of the traffic class and priority queue can then decide the optimal routing, load balancing and remediation to be used for that flow given the prevailing network conditions at that point of time. The network stack can use the following innovations to adapt to dynamic network conditions:

In an intelligent default, the distributed management plane (e.g. an orchestrator) sets up the edge device with a set of default QoS settings for each application. Each application can then be tagged with an SLA. The SLA can indicate a hint to the edge device for the prioritization and/or sensitivity for that particular application.

In an intelligent preemption, a multi-tenant, geo-diverse, network transport agnostic overlay network can be implemented. This can create a situation where the network can pre-empt adverse and/or localized network events by statistical and heuristics based analysis of the network monitoring data that is collected at the orchestrator. This can remediate certain network conditions that are not addressed by adaptive QoS (e.g. tail drops which result in large number of packets dropped indiscriminately in the core of a service provider network) due to time taken to adapt and the fact that such a loss cannot be really compensated. In a geo-localized region, in the event of constant tail drops for a network service provider, the service can proactively turn on aggressive FEC (e.g. 'always-on FEC') for sensitive applications in both the specific geo-location. In one example, a slightly larger geography for sites that are using the same provider can be used in lieu of the specific geo-location. The 'always-on FEC' can also be configured at the orchestrator in order to pre-empt network errors and react faster to network errors.

Adaptive QoS can be implemented by monitoring and/or instrumenting network paths. For example, adaptive QoS can be implemented to remediate a network condition that may not conform to the configured SLA for that application. To offset the overheads as a result of the continuous monitoring, the QoE (e.g. user responsiveness) can be periodically or constantly computed to reduce/augment the network monitoring.

Smart QoS can utilize deep learning methods. In addition to responding to dynamic network conditions, the smart QoS can work in tandem with application performance monitoring (APM) to adjust traffic priority based on L7 data. When the DPI engine fails to identify the application, the network stack can utilize statistical parameters (e.g. packet arrival rate, throughput) and heuristics (e.g. User Datagram Protocol (UDP) can be used by real-time applications) to identify the right set of technologies to provide the best performance.

Slow Learning with Crowdsourcing Examples

Slow learning (e.g. application aware routing) with crowdsourcing methods can include generating a prepopulated list of well-known applications augmented by mid-flow detected data from DPI engine. This can enable determination of application with the first packet. Prepopulated data is automatically validated by DPI engine and any changes are fed back locally as well as communicated to the orchestrator. Some or all data can be shared to other edges/enterprises via the orchestrator. In one example, L3, L4 network information can be used to create a composite application-routing database. The application-routing database can be populated by three different types of learning/sources. The first source of information built into the database can include a pre-populated map of DIP/DPORT (Destination Internet Protocol Address/Destination Port Number) to application types (e.g. termed fast learning). A second source of information can include a map of DIP/DPORT to applications that is learned from 'mid-flow' application detection by the DPI engine (e.g. slow learning). The third source of information can also include a map of DIP/DPORT to application names. This can include crowdsourced (e.g. DIP/DPORT to application name mapping) information that is anonymized and aggregated at the orchestrator. This mapping can then be shared across different enterprises (e.g. crowd-sourced learning).

Various methods of populating, updating and recovering the application-routing database are now provided. The application-routing database can be pre-populated with the set of known applications that can be identified by the DIP/DPORT and/or packaged as a part of the CPE. Alternatively, it can be downloaded from the orchestrator. Additionally, an IT Administrator may enter customised DIP/DPORT to application mappings which can be added to the application routing database in the edge device via the orchestrator. This method can be a component of fast learning.

The application-routing database can also be updated by 'mid-flow' DPI detection data as a result of slow learning methods on the edge device. In addition to this, the fast learning data and slow learning updates from different enterprises can be anonymized and/or aggregated at the orchestrator. It can be sent down to all the edge device(s) under the management of the orchestrator. These updates can be part of the crowd-sourced learning methods.

An example application-routing database recovery method is now provided. When an edge device first communicates with the orchestrator, it can receive the data for pre-population of the application-routing database. This information can include any updates. Updates from slow learning and/or crowd-sourced learning can be synchronised to shared memory areas in the edge device. The updates can be recovered from service outages.

Figure 6:
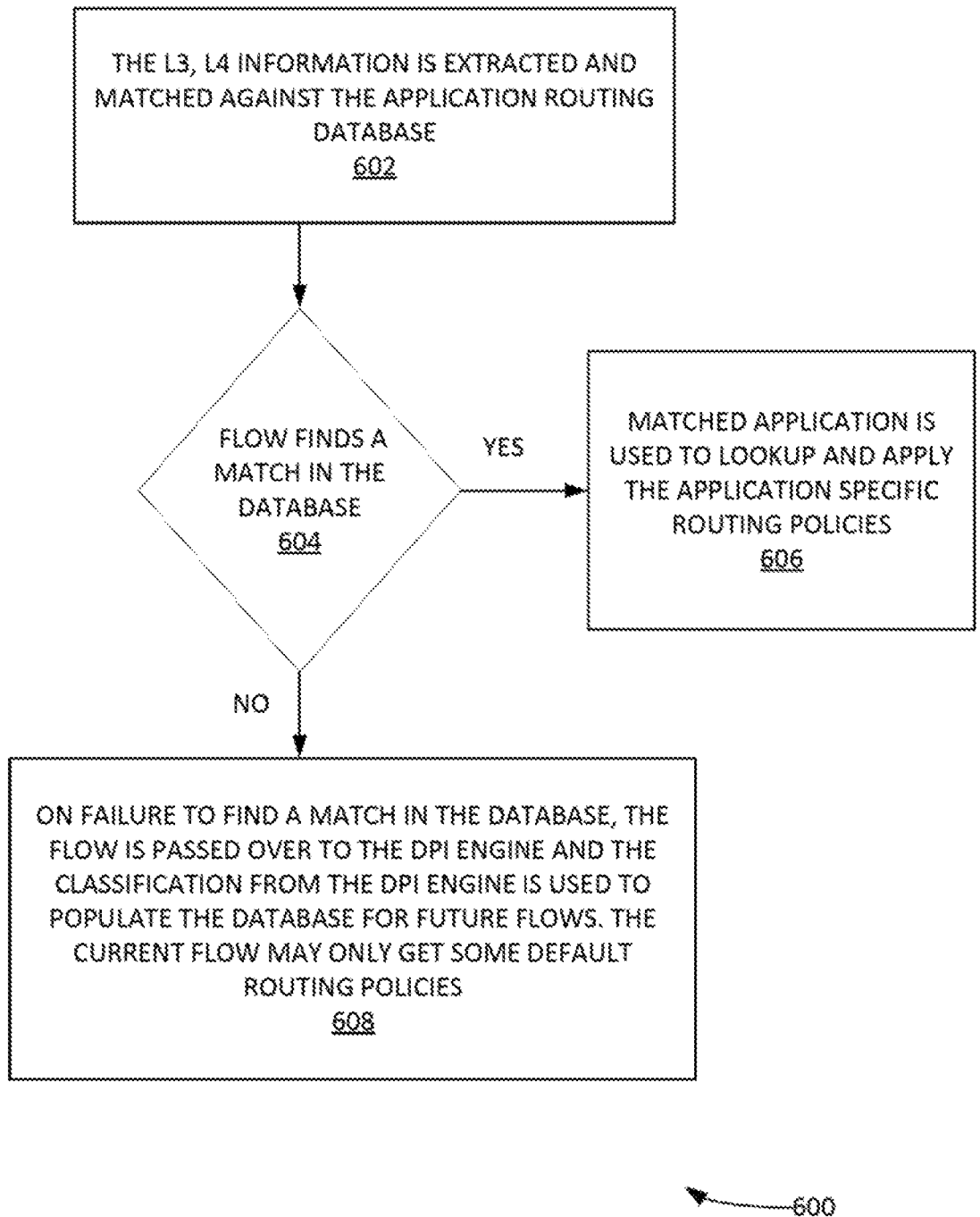
FIG. 6 illustrates an example process of an application aware routing, according to some embodiments.

FIG. 6 illustrates an example process 600 of an application aware routing, according to some embodiments. In step 602, the L3, L4 information is extracted and matched against the application routing database (e.g. database in FIG. 6). In step 604, if this flow does not find a match in the database, then process 600 moves to step 608. If 'yes', then process 600 moves to step 606. In step 606, the matched application is used to look-up and apply the application specific routing policies. In step 608, on failure to find a match in the database, the flow is passed over to the DPI engine. The classification from the DPI engine is used to populate the database for future flows. The current flow may obtain some default routing policies as well. In this way, when the same application flow is encountered again, it can find a successful match in database. The application specific routing policy can then be applied for that application flow. A worst case guarantee of application routing from the second flow can be provided in some examples.

Figure 7:
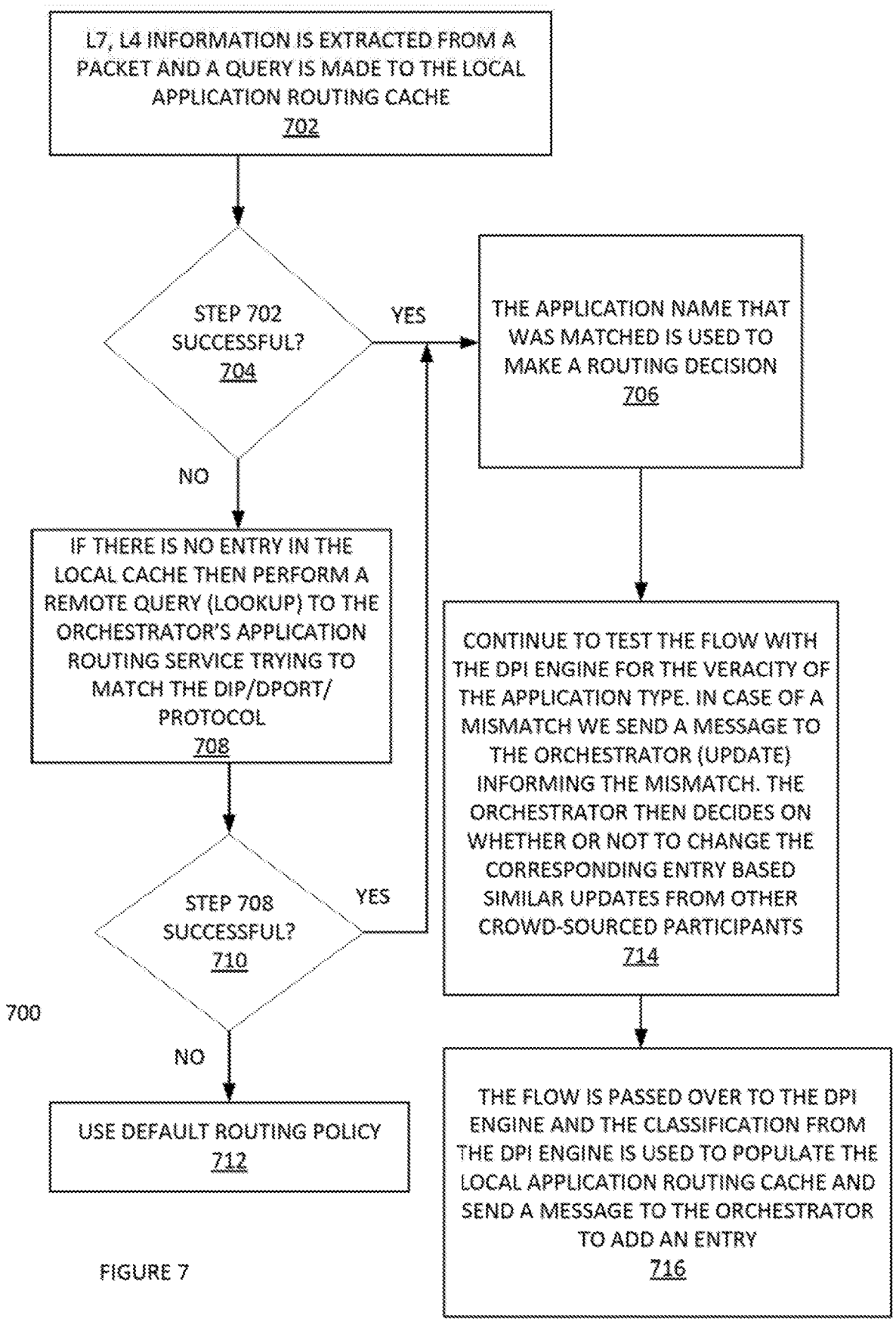
FIG. 7 illustrates another example process of an application aware routing, according to some embodiments.

FIG. 7 illustrates another example process 700 of an application aware routing, according to some embodiments. For example, in an alternative step 608, the L3, L4 information can be communicated to an application routing lookup service (e.g. can be a local service synchronized with an aggregated crowd source updated remote service running in the orchestrator like DNS). This can return the application match for the flow with a higher probability even on the first flow. In this incarnation, the application-routing database can reside in the orchestrator. The edge-device queries the application-routing database via the application routing lookup service. The edge-device can cache the responses from the lookup. Optionally, the cached entries can be expired using a TTL (Time-to-Live) value. More specifically, process 700 illustrates an example packet flow illustration.

In step 702, the L3, L4 information can extracted from a packet and a query is made to the local application routing cache (e.g. cache lookup). In step 704, it can be determined if step 702 is successful. If 'yes', then process 700 can proceed to step 706. If 'no' then process 700 can proceed to step 708. In step 708, process 700 can perform a remote query (e.g. lookup) to the orchestrator's application routing service to match the DIP/DPORT/PROTOCOL. In step 710, it can be determined if a successful lookup was implemented in step 708. If 'yes', then process 700 can proceed to step 706. If 'no', then process 700 can proceed to step 712. In step 712, process 700 can use the default routing policy and continue to step 716 where the flow is passed over to the DPI Engine and the classification from the DPI Engine is used to populate the local application routing cache and inform the Orchestrator for future flows. In step 706, the application name that was matched is used to make a routing decision. In step 714, process 700 can continue to test the flow with the DPI engine for the veracity of the application type. In case of a mismatch, process 700 can send a message to the orchestrator (e.g. with an update operation), thus informing of the mismatch. The orchestrator can then decides on whether or not to change the corresponding entry based similar updates from other crowd-sourced participants.

Additional Exemplary Computer Architecture and Systems

Figure 8:
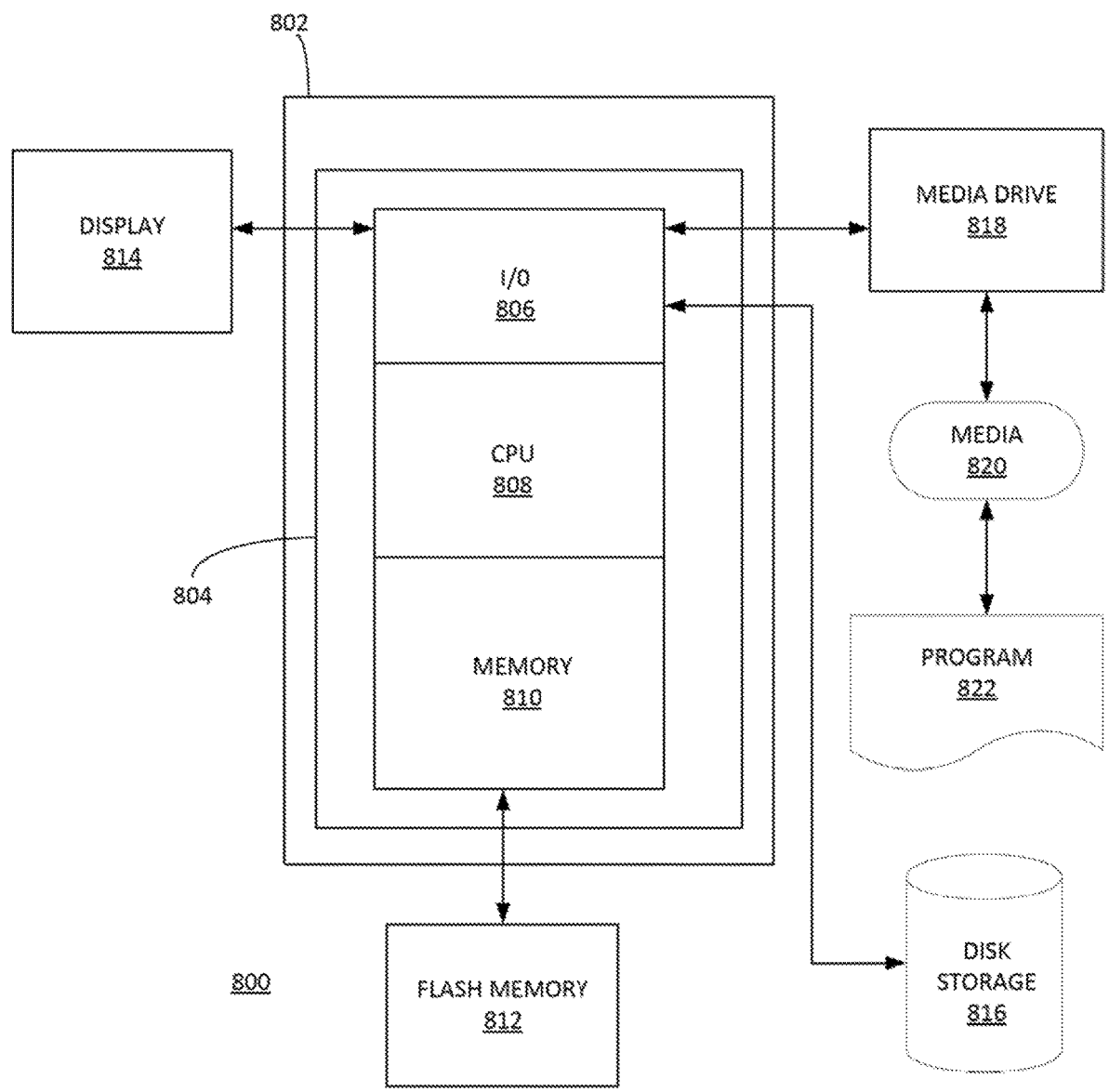
FIG. 8 depicts an exemplary computing system that can be configured to perform any one of the processes provided herein.

FIG. 8 depicts an exemplary computing system 800 that can be configured to perform any one of the processes provided herein. In this context, computing system 800 may include, for example, a processor, memory, storage, and I/O devices (e.g., monitor, keyboard, disk drive, Internet connection, etc.). However, computing system 800 may include circuitry or other specialized hardware for carrying out some or all aspects of the processes. In some operational settings, computing system 800 may be configured as a system that includes one or more units, each of which is configured to carry out some aspects of the processes either in software, hardware, or some combination thereof.

FIG. 8 depicts computing system 800 with a number of components that may be used to perform any of the processes described herein. The main system 802 includes a motherboard 804 having an I/O section 806, one or more central processing units (CPU) 808, and a memory section 810, which may have a flash memory card 812 related to it. The I/O section 806 can be connected to a display 814, a keyboard and/or other user input (not shown), a disk storage unit 816, and a media drive unit 818. The media drive unit 818 can read/write a computer-readable medium 820, which can contain programs 822 and/or data. Computing system 800 can include a web browser. Moreover, it is noted that computing system 800 can be configured to include additional systems in order to fulfill various functionalities. Computing system 800 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method for implementing a virtual private network (VPN) between a cloud gateway node and a network comprising a plurality of subnets, the method comprising:
   at an edge device connecting the network to at least one external network:
   receiving a plurality of subnet VPN statuses for the plurality of subnets, each subnet VPN status specifying whether a particular subnet of the network is accessible over the VPN;
   forwarding the plurality of subnet VPN statuses to the cloud gateway node in a public cloud connected to the edge device through an external network, wherein the cloud gateway node uses the plurality of subnet VPN statuses to determine whether received traffic for a subnet should be sent over the VPN; and
   receiving, over the VPN, traffic from the cloud gateway node for subnets determined to be VPN-accessible.

2. The method of claim 1, wherein receiving the traffic over the VPN comprises, when a subnet VPN status indicates that a particular subnet is accessible over the VPN, receiving traffic for the particular subnet using at least one secure Internet Protocol Security (IPSec) tunnel between the edge device and the cloud gateway node.

3. The method of claim 1 further comprising:
when a subnet VPN status indicates that a particular subnet is not accessible over the VPN, receiving, at the edge device, traffic for the particular subnet from the cloud gateway node through a set of unsecure tunnels between the edge device and the cloud gateway node.

4. The method of claim 3, wherein edge device is connected to the cloud gateway node by a plurality of multipath protocol tunnels which comprise the set of unsecure tunnels.

5. The method of claim 4, wherein the plurality of multipath protocol tunnels spans a plurality of network links, the plurality of network links comprising at least two of a DSL link, a fiber link, a broadband cable link, and a cellular network link.

6. The method of claim 1 further comprising:
when a subnet VPN status indicates that a particular subnet is accessible over the VPN, forwarding traffic from the particular subnet to the cloud gateway node over the VPN through at least one secure Internet Protocol Security (IPSec) tunnel between the edge device and the cloud gateway node; and
when a subnet VPN status indicates that a particular subnet is not accessible over the VPN, forwarding traffic from the particular subnet to the cloud gateway node through a set of unsecure tunnels between the edge device and the cloud gateway node.

7. The method of claim 1, wherein the network is a first network, the edge device is a first edge device, and the particular subnet is a first subnet, wherein:
receiving traffic for the particular subnet over the VPN comprises receiving traffic from a second network comprising a second edge device connecting the second network to an external network; and
the second edge device sends traffic from the second network to one of the same cloud gateway node and another cloud gateway node through at least one IPSec tunnel implementing the VPN.

8. The method of claim 7, wherein the first network is an enterprise datacenter of a particular enterprise and the second network is one of a client of the particular enterprise and a branch office belonging to the particular enterprise.

9. The method of claim 1, wherein:
receiving the plurality of subnet VPN statuses comprises receiving a set of gateway configuration data;
forwarding the plurality of subnet VPN statuses comprises forwarding the set of gateway configuration data to the cloud gateway node; and
the edge device and the cloud gateway node use the gateway configuration data to configure between the edge device and the cloud gateway node a plurality of multipath protocol tunnels and at least one secure Internet Protocol Security (IPSec) tunnel for implementing the VPN.

10. The method of claim 9, wherein the edge device and cloud gateway node maintain the IPSec tunnel even when none of the subnets of the network are available over the VPN.

11. The method of claim 9, wherein:
the cloud gateway node uses the gateway configuration data to configure a virtual routing and forwarding (VRF) table comprising an entry for each subnet of the network and stores the forwarded subnet VPN statuses in their corresponding subnet entries in the VRF table; and using the subnet VPN statuses to determine whether received traffic for a subnet should be sent over the VPN comprises searching the VRF table for a subnet VPN status.

12. The method of claim 1, wherein the cloud gateway node comprises a virtual routing and forwarding (VRF) table comprising an entry for each subnet of the network and stores the forwarded subnet VPN statuses in their corresponding subnet entries in the VRF table.

13. A non-transitory machine readable medium storing a program that when executed by a set of processing units at an edge device implements a virtual private network (VPN) between a cloud gateway node and a network of the edge device which comprises a plurality of subnets, the program comprising sets of instructions for:
at the edge device connecting the network to at least one external network:
receiving a plurality of subnet VPN statuses for the plurality of subnets, each subnet VPN status specifying whether a particular subnet of the network is accessible over the VPN;
forwarding the plurality of subnet VPN statuses to the cloud gateway node in a public cloud connected to the edge device through an external network, wherein the cloud gateway node uses the plurality of subnet VPN statuses to determine whether received traffic for a subnet should be sent over the VPN; and
receiving, over the VPN, traffic from the cloud gateway node for subnets determined to be VPN-accessible.

14. The non-transitory machine readable medium of claim 13, wherein the set of instructions for receiving the traffic over the VPN comprises a set of instructions for, when a subnet VPN status indicates that a particular subnet is accessible over the VPN, receiving traffic for the particular subnet using at least one secure Internet Protocol Security (IPSec) tunnel between the edge device and the cloud gateway node.

15. The non-transitory machine readable medium of claim 13, wherein the program further comprises sets of instructions for:
when a subnet VPN status indicates that a particular subnet is not accessible over the VPN, receiving traffic for the particular subnet from the cloud gateway node through a set of unsecure tunnels between the edge device and the cloud gateway node.

16. The non-transitory machine readable medium of claim 15, wherein edge device is connected to the cloud gateway node by a plurality of multipath protocol tunnels which comprise the set of unsecure tunnels.

17. The non-transitory machine readable medium of claim 16, wherein the plurality of multipath protocol tunnels spans a plurality of network links, the plurality of network links comprising at least two of a DSL link, a fiber link, a broadband cable link, and a cellular network link.

18. The non-transitory machine readable medium of claim 13, wherein the program further comprises sets of instructions for:
when a subnet VPN status indicates that a particular subnet is accessible over the VPN, forwarding traffic from the particular subnet to the cloud gateway node over the VPN through at least one secure Internet Protocol Security (IPSec) tunnel between the edge device and the cloud gateway node; and
when a subnet VPN status indicates that a particular subnet is not accessible over the VPN, forwarding traffic from the particular subnet to the cloud gateway node through a set of unsecure tunnels between the edge device and the cloud gateway node.

19. The non-transitory machine readable medium of claim 13, wherein:
the set of instruction for receiving the plurality of subnet VPN statuses comprises a set of instructions for receiving a set of gateway configuration data;
the set of instructions for forwarding the plurality of subnet VPN statuses comprises a set of instructions for forwarding the set of gateway configuration data to the cloud gateway node; and
the program further comprises sets of instructions for, with the cloud gateway node, using the gateway configuration data to configure between the edge device and the cloud gateway node a plurality of multipath protocol tunnels and at least one secure Internet Protocol Security (IPSec) tunnel for implementing the VPN.

20. The non-transitory machine readable medium of claim 19, wherein the program further comprises sets of instructions for maintaining the IPSec tunnel with the cloud gateway node even when none of the subnets of the network are available over the VPN.

\* \* \* \* \*